US011954096B2

(12) United States Patent
Springer et al.

(10) Patent No.: US 11,954,096 B2
(45) Date of Patent: Apr. 9, 2024

(54) DATABASE FACET SEARCH

(71) Applicant: BBY Solutions, Inc., Richfield, MN (US)

(72) Inventors: Chris Springer, Richfield, MN (US); David Lukaska, Richfield, MN (US); Punit Virdi, Richfield, MN (US); Lakshme Acharya Madhav, Richfield, MN (US); Ravi Challagundla, Richfield, MN (US)

(73) Assignee: BBY Solutions, Inc., Riichfield, MN (US)

( * ) Notice: Subject to any disclaimer, the term of this patent is extended or adjusted under 35 U.S.C. 154(b) by 196 days.

(21) Appl. No.: 17/508,040

(22) Filed: Oct. 22, 2021

(65) Prior Publication Data

US 2022/0129449 A1  Apr. 28, 2022

Related U.S. Application Data

(60) Provisional application No. 63/105,251, filed on Oct. 24, 2020.

(51) Int. Cl.
*G06F 16/242* (2019.01)
(52) U.S. Cl.
CPC .............. *G06F 16/2423* (2019.01)
(58) Field of Classification Search
None
See application file for complete search history.

(56) References Cited

U.S. PATENT DOCUMENTS

| | | | |
|---|---|---|---|
| 2009/0198675 A1* | 8/2009 | Mihalik | G06F 16/248 707/999.005 |
| 2010/0077001 A1* | 3/2010 | Vogel | G06F 16/353 707/777 |
| 2017/0364596 A1* | 12/2017 | Wu | G06F 16/93 |
| 2018/0232450 A1* | 8/2018 | Bivens | G06F 16/93 |
| 2018/0322221 A1* | 11/2018 | Ambale | G06F 16/9038 |
| 2019/0392077 A1* | 12/2019 | Kikuchi | G06F 16/3334 |
| 2021/0157856 A1* | 5/2021 | Tsuzuku | G06F 16/355 |

* cited by examiner

*Primary Examiner* — Son T Hoang
(74) *Attorney, Agent, or Firm* — Forsgren Fisher; Daniel A. Tysver; James M. Urzedowski

(57) ABSTRACT

A system and method are presented that utilize facet modifications to alter user input values to perform a facet search on a found set of data records. The facet modifications are associated with item records, such as by using type attributes. Facet modifications can be associated with query information that is utilized to create a query on a user interface. Input received from the query is then modified according to the facet modifier in order to create facet search parameters. The facet search parameters are used to perform a facet search to narrow the found set of item records. In some embodiments, facet modifications are stored in facet modifier records. Multiple facet modifications can be stored in a single facet modifier record. A single query input can be manipulated by multiple facet modifications to create separate facet search parameters.

20 Claims, 5 Drawing Sheets

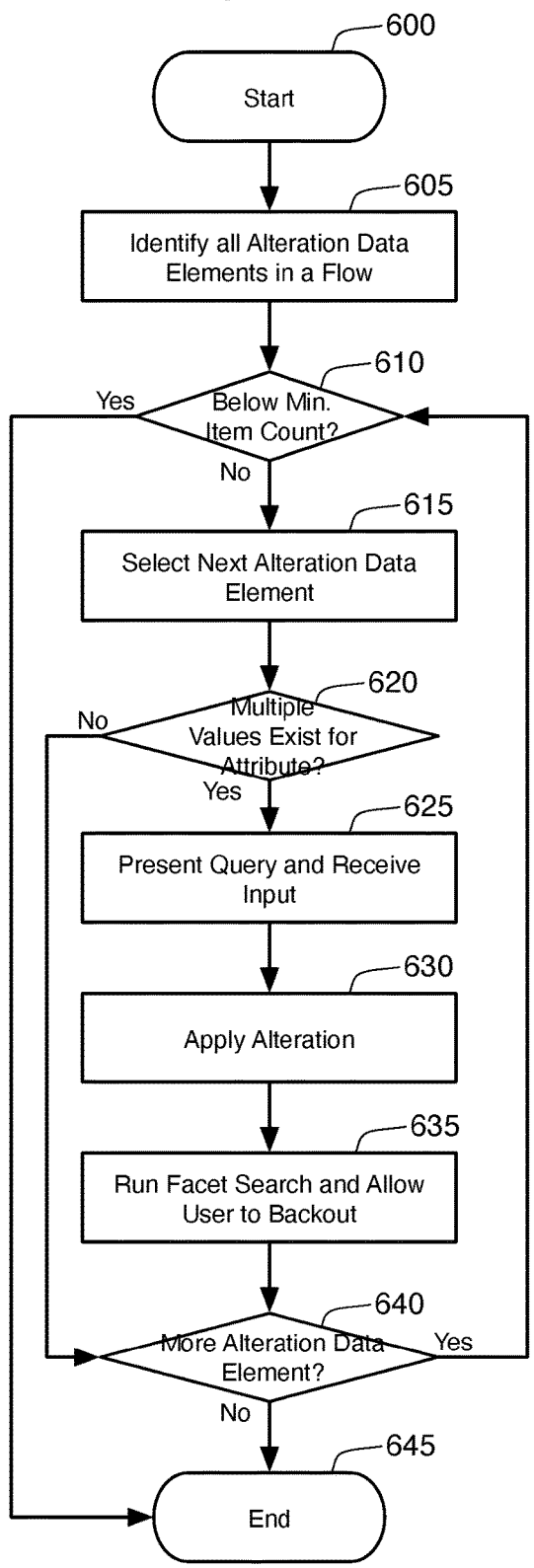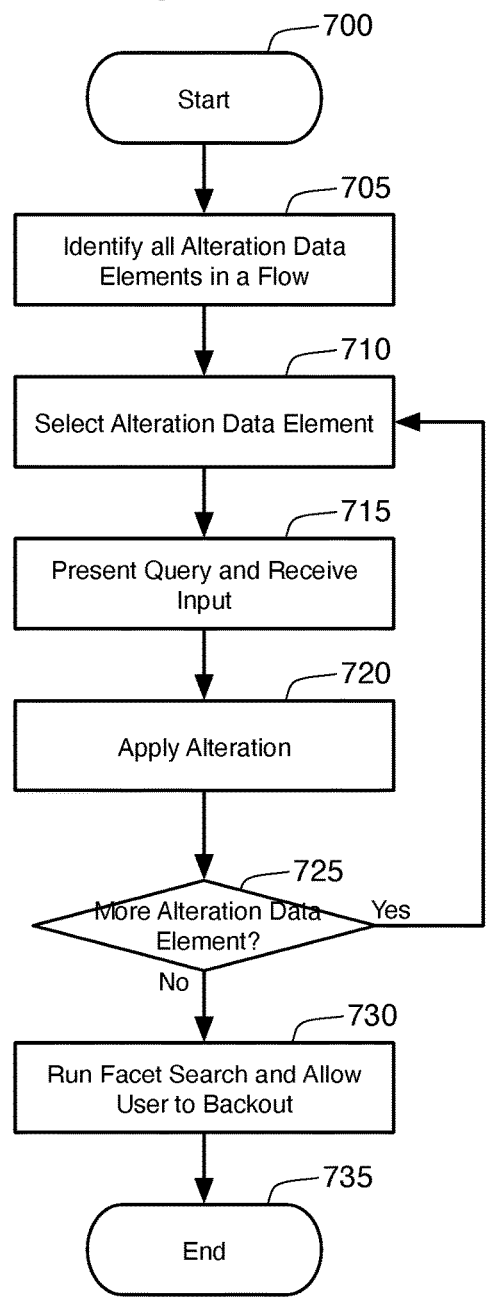

DATABASE FACET SEARCH

FIELD OF THE INVENTION

The present application relates to the field of computerized database searching. More particularly, the present application relates to automated facet modification to improve facet searching in a computerized database.

BACKGROUND OF THE INVENTION

Facet searching is frequently used in the context of computerized data that represent real-world physical objects. A user search on this data will result in a set of found data records. These found records can then be analyzed to determine facets that can be used to narrow the search results. Facets represent properties that are shared by sub-groups of the found records. Facets searching is similar to filter tools that filter out some search results based on pre-defined categories. While ordinary filters are pre-defined for an entire database, facets are created based on an analysis of found records to find properties that relate to items in the found set. In many cases, facets relate to predefined attributes in a database, such as fields in a database table or defined attributes of a database object.

SUMMARY OF THE INVENTION

While facet searching is an important way to narrow search results, many users are not be able to accurately identify the appropriate parameters for a facet search. For example, they may lack the knowledge necessary to select an appropriate value for certain facet attributes. The present invention utilizes facet modifications that are associated with item types or other linking data. Depending on the item records that are incorporated into the set of found records, a particular facet modification (or multiple facet modifications) may be selected. In some cases, facet modifications are found in facet modifier records and are associated with query information.

A server can be responsible for identifying facets for a found item records and identifying appropriate facet modifier records. Upon receiving user input selecting a particular facet for searching, the facet modifier record is utilized to provide the input prompts and to modify the resulting input. The server is then responsible for executing the facet search based on the modified inputs. The result is an improved facet search technique that presents more relevant records from the search than would be available to a user without the facet modifier records.

BRIEF DESCRIPTION OF THE DRAWINGS

FIG. 6 is a flow chart showing a first method of applying multiple alteration data elements.

FIG. 7 is a flow chart showing a second method of applying multiple alteration data elements.

DETAILED DESCRIPTION

System 10

Figure 1:
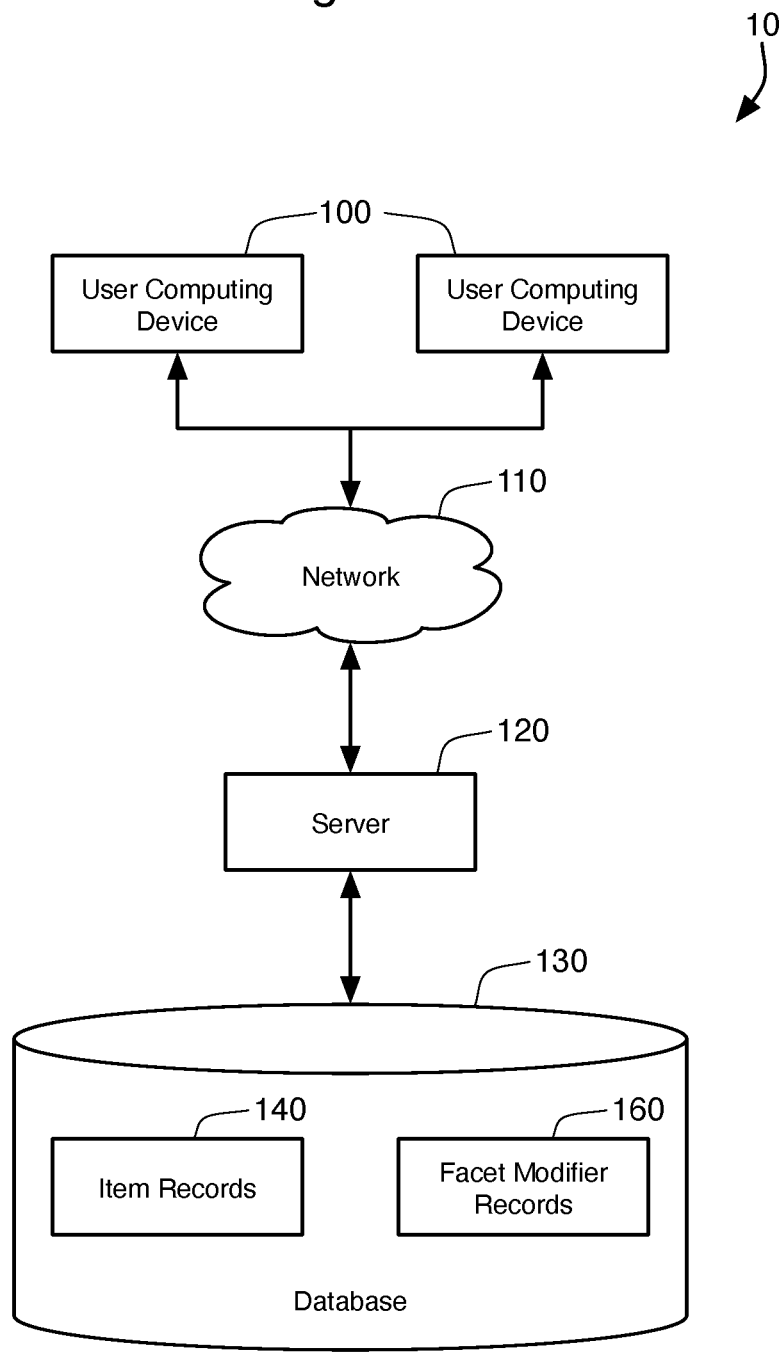
FIG. 1 is a schematic view of one embodiment of a system for performing the present invention.

FIG. 1 shows a system 10 which is utilized to perform one embodiment of the present invention. In this embodiment, one or more user computing devices 100 access a server 120 over a network 110. In system 10, a user computing device 100 may be a computer operating a web browser or other application, or a tablet or smart phone operating either a browser or an app (such as an e-commerce app). The user device 100 communicates with the server 120, which performs database searches on a database 130 and presents the results of those searches to the user computing device 100. The server 120 might operate on a single computing device. Alternatively, a group of computing devices may jointly provide the database searching abilities of the server 120. The database 130 contains item records 140, which contain the data that is desired to be search. As an example, the item records 140 may be digital media items. In another example, the item records 140 represent physical objects. These physical objects might be items for sale by a retailer or wholesaler. In these cases, the server 120 may operate not only to provide database searching capabilities to the item records 140 but may also operate as an e-commerce platform allowing the purchase of the physical or digital items represented by the individual item records 140.

In practice, the server 120 operates on one or more computing devices each having a processor, random access transient memory, non-transient memory or storage, and network interface hardware. The server 120 operates under the control of programming instructions that direct the processor to provide user interfaces over the network 110 to the user computing device 100. The instructions also direct the processor to query the database 130 and to provide desired data content to the user computing device 100. Queries of the database 130 relate to discovering item records 140 of interest to the user operating one of the user computing devices 100. The queries generally relate to attributes stored in (or in association with) the item records 140. Data can be associated with other data in the database 130 through standard techniques, such as by relating tables together in a relational database system, or by relating objects to each other in an object-oriented database.

In the preferred embodiment, the server 120 allows for facet searching on the item records 140. Facet searching is similar to filtering of item records 140. After a user specifies a query of the item records, the server 120 will present a listing (or partial listing) of item records 140 that match the search criteria. Filtering is generally a process where users can specify attributes of the item records that the user desires. For instance, in an e-commerce setting, the user may select a price range ($1,000 to $1,500), or a minimum user review score (4+ stars). These types of attributes are made available for filtering, and do not vary based on the type of item records returned in the user's original search of the item records 140.

Facet searching is similar, except that the item records returned in the original search are examined for facets that are particularly relevant to the searched results. For example, if a user is searching a database of vehicles for sale, and the resulting items all relate to sports cars, facets made available for further refinement might include engine placement (mid-engine, front-engine) and spoilers. If the resulting items all related to pickup trucks, the facets made available for refinement might relate to towing capacity and bed length and width. Thus, even though the same database 130 contains item records 140 for both sports cars and pickup trucks, the facet searching allows only facets relevant to currently displayed items to be presented to a user computing device 100 for refining search results. In the example of appliance searches as described below, the facets for refrigerators might include height, width, depth, finish, and number of drawers, while the facets for a washing machine might include washing mechanism and capacity.

One problem with user-directed facet refinement searching is that users frequently have imperfect knowledge on the attribute values that are needed for a particular search. The user may have knowledge about a related item, such as the size or identity of an item that they need to carry in their pickup truck, but do not know how that correlates to a minimum bed length and width for their facet refinement search. For example, the user may know they want to carry twenty sheets of plywood flat inside the pickup bed, but does not know what minimum length, width, and load capacity of the pickup bed that could achieve that goal. Similarly, the user may know the size of an opening in their kitchen for a refrigerator, but not know anything about the minimum clearance requirements that a refrigerator of a particular type, subtype, make, or model will require. If the user knows they have a 69-inch-high opening in their kitchen, they may specify a maximum height of 69 inches in the facet search without realizing that their desired manufacturer requires an inch of clearance to insure proper ventilation.

The system 10 addresses this limitation with standard facet searching by maintaining facet modifier records 160 in the database 130. These modifier records 160 are associated with particular item records 140 and contain the information necessary to translate from information known to the users of the user computing devices 100 to the data required to perform an appropriate facet search of the item records 140. In particular, a facet modifier record 160 may be capable of converting the need to carry twenty sheets of plywood into a pickup bed minimum height, width, and load capacity facet search, and a different facet modifier record 160 may convert between an opening in a kitchen and a workable height and width for a refrigerator that can be used in that space.

While FIG. 1 shows that the item records 140 exist in the same database 130 as the facet modifier records 160, this is not a requirement of the present invention. It is possible for facet modifier records 160 to exist in an independent database that is separated from the database 130 that contains the item records 140. All that is necessary is for the server 120 to be able to access and associate together the item records 140 and the facet modifier records 160.

Facet Modifier Records

Figure 2:
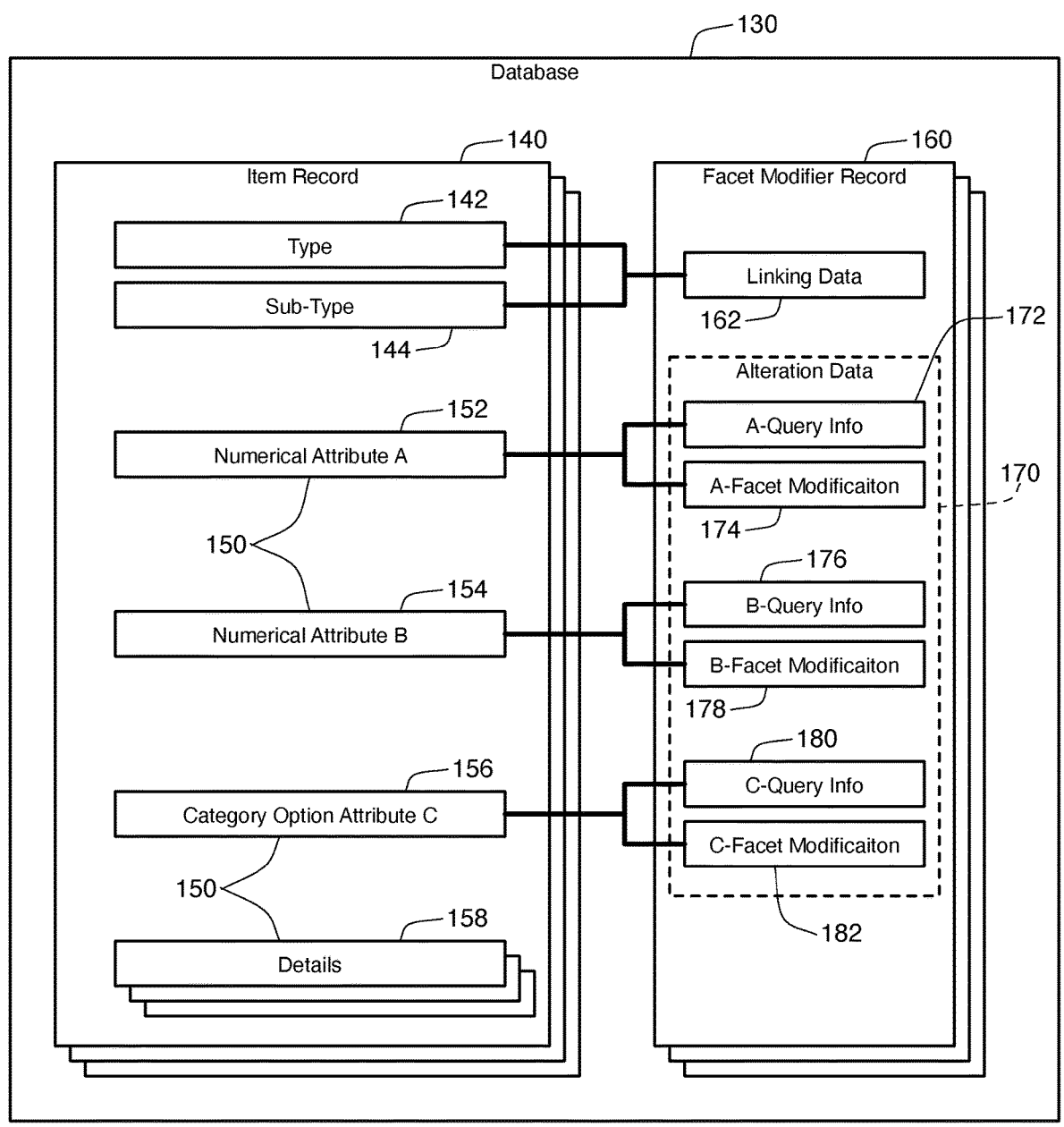
FIG. 2 is a schematic view of data in a database including facet modifier records and their relationship to item records.

FIG. 2 shows the database 130 with item records 140 and facet modifier records 160 in more detail. The item record 140 contains attributes that contain data for that item record 140. The attributes may take the form of columns in a relational database table. In a relational database construct, the attributes may also comprise attributes found on related data tables. In an object-oriented database, the attributes may take the form of object attributes, or attributes of related or linked to objects. Regardless of the construction of the database 130, the attributes comprise data that is associated with one instance or record of item record 140.

The type attribute 142 and sub-type attribute 144 shown in FIG. 2 define an overall type for the item record 140. For instance, a vehicle item record 140 may have a type attribute 142 value of "pickup truck" and a sub-type attribute 144 of "compact pickup truck," while a refrigerator item record 140 may have a type attribute 142 of "refrigerator" and a sub-type attribute 144 of "French-door style." In FIG. 2, the item record 140 has a plurality of data attributes 150. Two of the data attributes 150 are numerical attributes, namely attribute A 152 and attribute B 154. In addition, the item record 140 has a category option attribute C 156 and a plurality of other details attributes 158. The category option attribute C 156 is for an attribute that can take a value selected from a set of values, such as a set of text-based values. For example, an item record 140 related to a French door style refrigerator may have a first numerical attribute 152 for height and a second numerical attribute 154 for width. The category option attribute 156 might be for depth ("cabinet-depth" or "standard depth"), for freezer location ("top" or "bottom"), or for ice makers ("in-door," "in freezer," or "none"). The other details attributes 158 may relate to color, efficiency rating, manufacturer, or model number.

The facet modifier records 160 contain data that is useful for modifying input data received from a user so that is it more amendable to a successful facet search of the item records 140. In the embodiment shown in FIG. 2, a facet modifier record 160 has linking data 162 that is used to associate the facet modifier record 160 with one or more item records 140. In the example of FIG. 2, the linking data 162 is associated with a type attribute value 142, a sub-type attribute value 144, or a combination of a type attribute 142 and sub-type attribute 144 values. For instance, facet modifier records 160 may define data or instructions to modify input data so as to improve the facet searching of a compact pickup truck, or to improve the facet searching of French-door refrigerators. The connection between these facet modifier records 160 and the item records is made by matching the type attribute 142 and sub-type attributes 144 of the item records 140 with the linking data 162 in the facet modifier record 160. There is no requirement that the data in the item record 140 that matches the linking data 162 be a "type" attribute 142 and a "sub-type" attribute 144, only that the linking data 162 can link with some type of corresponding linking data 142, 144 in the item record 140.

In addition to the linking data 162, the facet modifier record 160 contains alteration data 170 for one or more of the data attributes 150 in the item records 140. In the example embodiment shown in FIG. 2, the facet modifier record 160 is designed to improve the facet searches related to numerical attribute-A 152, numerical attribute-B 154, and category option attribute C 156. In this embodiment, input data related to a facet search on these attributes 152-156 are altered according to alteration data 170 in the facet modifier record 160. The alteration data 170 may, for example, convert input data for use in a facet search by subtracting 3% to a height input value, by subtracting 2 inches from a width input value, by adding 10% to an ampere load input value, by converting an input of a number of cement blocks to be carried to the equivalent mass, by converting an inputted trailer type to a towing capacity rating, or any other type of manipulation of an input value. The alteration data 170 is not limited to mathematical manipulations, as the alteration data 170 may utilize queries made to the user and query responses to select among options in a category option attribute.

In the embodiment shown in FIG. 2, the alteration data 170 for each data attribute being modified 152, 154, 156 generally includes both query information 172, 176, 180 and associated facet modifications 174, 178, 182, respectively. Attribute-A query info 172 defines a query that is made to a user in order to prompt an input related to attribute A 152, while attribute-A facet modification 174 defines a mathematical alteration that could be made to that received input to define a query value for attribute A 152. Attribute-B query info 176 and attribute-B facet modification 178 operate similarly in connection with numerical attribute B 154. Attribute-C query info 180 also defines a query submitted to a user related to category option attribute C 156, while attribute-C facet modification 182 will convert the information submitted in response to this query into a selection for category option attribute C 156. The query information 172, 176, 180 may define the full language and user interface requirements to create a full query that is presented to the user. Alternatively, the query information 172, 176, 180 may simply include enough data so that a full query can be based on this query information 172, 176, 180, such as by defining only sentence stubs or labels that can be used by a computer program to present full sentence queries to the user.

Each facet modifier record 160 is associated with a particular subset of item records 140, as identified by the linking data 162. In the example of FIG. 2, the subset is determined by the type attribute 142 and sub-type attribute 144. Note that the use of the "type" attribute label for attribute 142 and the "subtype" attribute label for attribute 144 are used merely for the purpose of describing the invention. Additional or alternative attributes may also be used to match modifier records 160 with item records 140, and these matching attributes may be considered the "type" attribute 142 (or the combination of type attribute 142 and subtype attribute 144). For example, the facet modifier record 160 may relate to a manufacturer. A facet modifier record 160 associated with Ford pickup trucks, for example, may contain knowledge that Ford pickups routinely understate their bed width, while a facet modifier record 160 for LG brand refrigerators may reflect the fact that LG refrigerators require an additional ¼ inch of width clearance when determining whether a refrigerator will fit in an opening.

The facet modifications 174, 178 related to numerical attributes 152, 154 may contain range information to automatically select a range for a facet search. For example, if numerical attribute A 152 relates to the towing capacity of a pickup truck, attribute-A query info 172 may present options to a user to select the maximum size trailer that the vehicle would be asked to tow. The user may respond to the query by indicating that their maximum size trailer is a small trailer that carries two snowmobiles. The attribute-A facet modification 174 will convert this information into a minimum towing capacity for use in querying numerical attribute A 152. This same attribute-A facet modification 174 will also contain range data information, which will assume that this user is not interested in vehicles with more than three times the identified towing capacity. Consequently, the facet modification 174 will establish the upper limit value for that attribute 152 in order to create a range for the facet search. The resulting facet search will search for pickup trucks between the minimum towing capacity for the small snowmobile trailer and three times that capacity. Similarly, a facet modification 178 relating to refrigerators may include a range limit on the width or height of a refrigerator. A user's input of a kitchen opening height in response to a query derived from query info 176 may be converted by the facet modification 178 into a maximum height for the refrigerator, while the range information in that facet modification 178 may indicate that a user would not be interested in any refrigerator more than three (or four or five) inches shorter than that maximum height. The assumption is that a user would not normally want a large gap above the refrigerator when installed into their opening.

FIG. 2 shows separate query info 172, 176, 180 and facet modifications 174, 178, 182 being defined for each attribute 152, 154, 156. In practice, however, facet modifications 174, 178, 182 could be combined into a single user query. For example, a query that determines the load a user would like to carry in a pickup truck bed, resulting in an answer of twenty sheets of plywood, would impact the length, width, and load weight capacity of the pickup truck, which would constitute three separate attributes 150 in the item record 140. In effect, a single query is used to assign facet search parameters relating to three different attributes. In this context, separate facet modifications 174, 178, 182 could all take the same query input and create different facet search parameters for their associated attribute 152, 154, 156.

Note that the facet modifier records 160 are independent from the item records 140 in the database 130. This means that the instructions in the facet modifications 174, 178, 182 can be changed without have to make changes to any of the item records 140. For example, the facet modifier record 160 may relate to laptop computers. Query info 172 may ask a user to select their desired uses for the new computer in order to determine whether the user needs a fast computer, a normal speed computer, or a rudimentary computer. Over time, the definition of what makes a computer "fast" compared to what makes a computer "normal" speed will change, as last year's fast computer will be normal speed today. To update this over time, all that is required is to change the facet modification 174 for this attribute in the facet modifier record 160. No programming changes are required, only a simple data update. In this way, system 10 becomes much more flexible than a system that merely hard-wires or custom-programs a relationship between a user's desire and an attribute search value.

EXAMPLE AND METHOD

Figure 3:
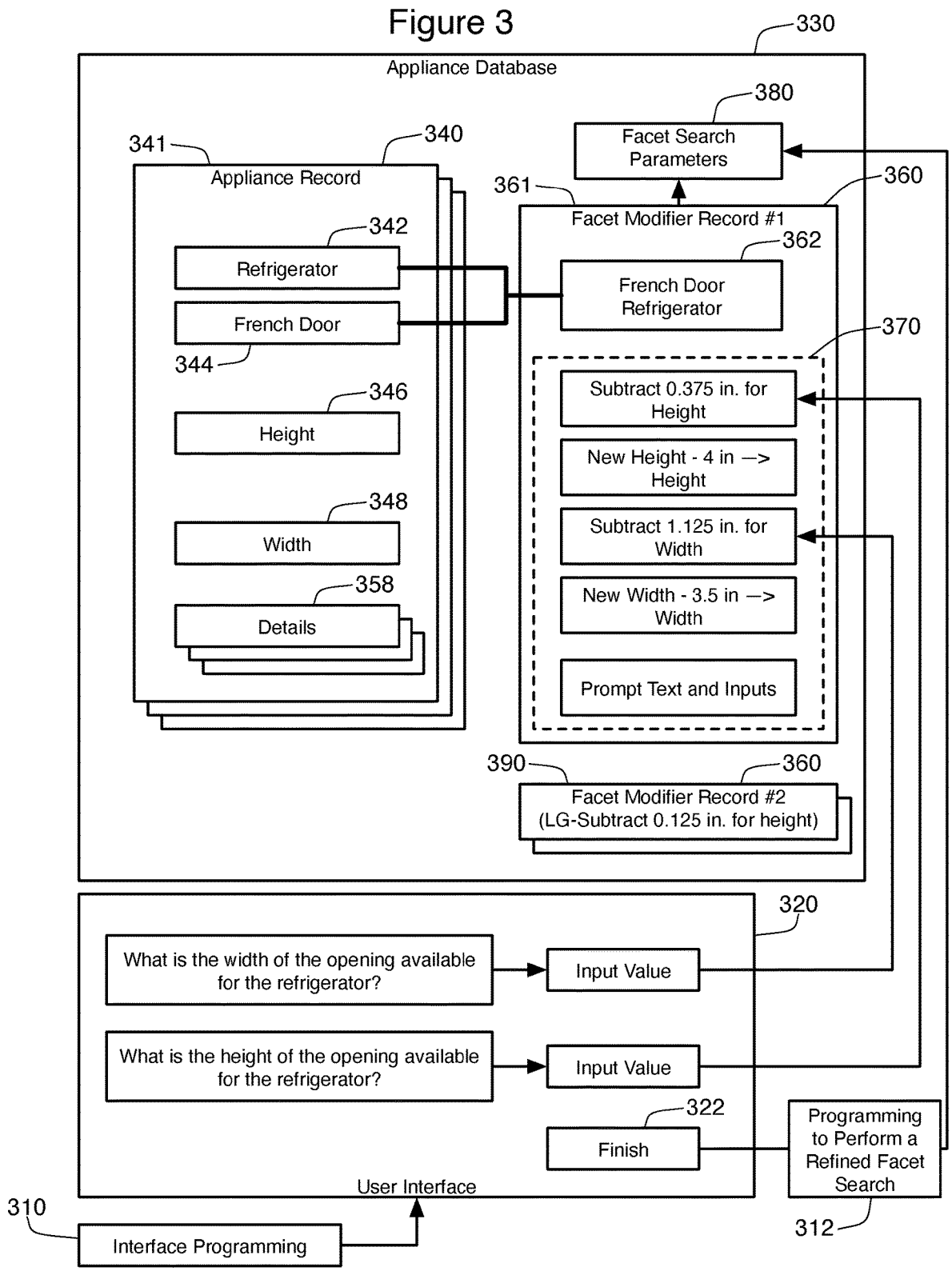
FIG. 3 is a schematic view of an example item record and an example facet modifier records in a database and a related user interface that can trigger an improved facet search under one embodiment of the present invention.
Figure 4:
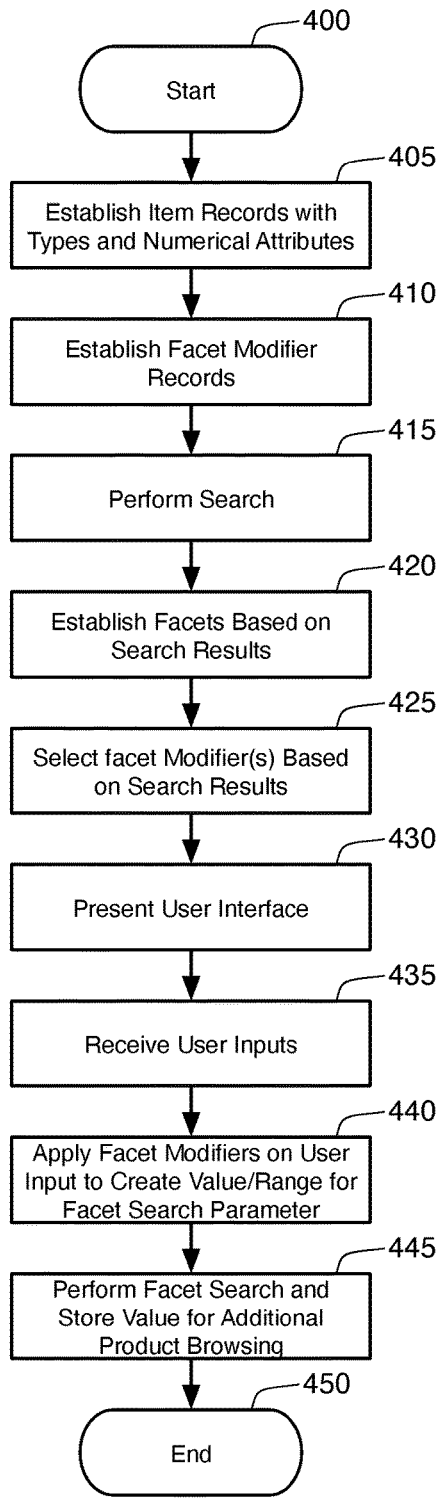
FIG. 4 is a flow chart showing an example method for performing the present invention.

FIG. 3 shows an example appliance database 330. A plurality of appliance records 340 and facet modifier records 360 exist in this appliance database 330. FIG. 3 shows details for a single appliance record 341 for a French door refrigerator, although all of the appliance records 340 will likely have similar attributes. FIG. 3 also shows details for a first facet modifier record 361 for that appliance record 341. In addition, FIG. 3 shows a user interface 320 to accept user input for a facet search of the appliance database 330 and for the display of appliance records 340. The use of these elements of FIG. 3 can be understood in the context of method 400 shown in FIG. 4.

The first step 405 of method 400 is to establish item records 340 in the appliance database 330. In this example, the item records 340 include type attributes 342 (such as "refrigerator") and sub-type attributes 344 (such as "French door"). The item records 340 also include some numerical attribute values, in this case a height attribute 346 and a width attribute 348 for the real-life refrigerator that is represented by this item record 340. Additional details 358 are also stored in the appliance record 340.

At step 410, facet modifier records 360 including record 361 are established that define how user input is to be modified for related item records 340 during a facet search. The facet modifier record 361 shown in FIG. 3 is for French door refrigerators, which is determined by the linking data 362 for record 361. In this case, the facet modifier record 361 contains alteration data 370 related to the height attribute 346 and the width attribute 348 in the appliance records 340. The alteration data 370 also contains information related to that query text that is to be presented to the user.

The next step 415 in the method 400 is to perform a search of the appliance database 330. For example, the appliance database 330 may contain data on many different types of appliances, and the user has searched for French door refrigerators at step 415. The search in step 415 is typically controlled by a user. The search may be based upon a textual search phrase entered by the user through their user computing device 100, or the search can utilize a categorical index in which a user can click through an index of item records to find a subset of records 340 that are of interest to them. For example, the user might have clicked on the word "Appliances," then "Refrigerators" and then "French Door Refrigerators" in an index, or the user may have typed in the words "French door refrigerators" into a search box.

At step 420, the server 120 analyzes the appliance records 340 that have been found by the search of step 415 and then identifies facets available for the user to further refine their search. The identification of facets based on user search results can be accomplished using a variety of techniques known in the art. In all cases, however, the facets will be selected based on the item records (the appliance records 340) that are returned by the user's search. If the user has searched for refrigerators, facets associated with the found refrigerator records 340 are identified for further refinement of the search results.

At step 425, facet modifier records 360 associated with the found appliance item records 340 are also identified. Facet modifier record 361, for example, is available for modifying the height and width attributes for refrigerators—in this case, for French door refrigerators. This facet modifier record 361 will be selected if appliance record 341 is in the found set because the linking data 362 matches the type attributes 342, 344 found in appliance record 341.

In some circumstances, multiple facet modifier records 160 may be relevant to the found item records 140 after a user search. In the example of FIG. 3, a user may have executed a general search for refrigerators, where one facet modifier record 361 applies only to French door refrigerators, while another facet modifier record 360 applies to freezer at the bottom refrigerators and a third facet modifier record 360 applies to refrigerators in general. Rules can be established for selecting which facet modifier records 360 are applicable and which ones should be used for which attributes. For example, the facet modifier records 360 can be assigned a hierarchy, with more general records 360 (such as the overall refrigerator record) applying unless its data is superseded by data in a more specific record 360. For instance, the general facet modifier record 360 for refrigerators may have modification data concerning to refrigerator heights, widths, and depth, while the French door facet modifier record 360 applies only to heights and weights. In this context, the hierarchy can use the modification data in the general refrigerator facet modifier record 360 to modify depths, and the modifications in the French door modifier record 360 to modify heights and weights for all French door refrigerator data records 340. The facet modifier records 390 applies to only a specific manufacturer, while others might apply only to a specific model. Thus, a facet modifier record 390 that applies only to LG French door refrigerators will be the most specific record 360 in the hierarchy (the refrigerator modifier record 360 being most general, the French door refrigerator facet record 361 having a middle level in the hierarchy, and the LG French door refrigerator being most specific).

If only French door refrigerator data records 340 were in the search result, all records would be handled in this manner. If the search results contained multiple types of refrigerator, it may be that different modification algorithms will be used for different subsets of data records 340. While this is possible and anticipated, for the purpose of simplicity, this example will assume that only French door refrigerator data records 340 are found in the search result, and only the French door refrigerator facet modifier record 361 shown in FIG. 3 applies to these records 340.

At step 430, a user input interface 320 is presented to the user upon the completion of the search performed in step 415. This user interface 320 is created by interface programming 310 found on the server 120. In some cases, the user interface 320 is presented whenever a search is performed and relevant facet modifier records 360 are identified. In other cases, the user is presented the option to use the user interface to input data that will be modified by record 360 in order to improve their search results. For example, the user might be presented with a "Will it Fit?" button, and the user interface 320 will be presented only upon a user selecting that button. In a third embodiment, the system will allow a user to select among available facets for searching, and only when a facet that is controlled by a facet modifier record 360 is selected is the user input interface 320 presented.

The user interface 320 presents prompts for user input. These prompts will be identified using prompt information found in the relevant facet modifier record 361. The prompt information can identify the specific query text and inputs as shown in FIG. 3. For example, the facet modifier record 361 can be designed to convert between the dimensions of an opening in a kitchen and appropriate dimensions for a refrigerator. In this case, the prompts in interface 320 relate to the dimensions of the opening in the user's kitchen and not refrigerator sizes. The user interface 320 therefore requests information about the width of the kitchen opening and the height of the opening. This data is then received from the user interface at step 435. Note that this input can take the form of a numerical value, such as the dimensions of an object. In other embodiments, the input can take the form of textual input or selecting from a preset list of values. For example, the input can ask the for general types of trailers that a user is hoping to pull, with the modifier record containing data to convert this input to a numerical value and range for towing capacity of a pickup truck. Note that a more specific facet modifier record, such as facet modifier record 390, might convert a textual input like this into a different numerical value that a more general facet modifier record, such as facet modifier record 360. In interface 320, the user indicates that they have completed the data input by pressing finish button 322, which triggers programming 312 on the server 120 to complete the facet search through the remainder of method 400.

At step 440, the facet modifier record 360 is applied on the user input to create a value and/or range to be used as the facet search parameters 380 for a facet detail search. In FIG. 3, the facet modifier record 360 contains instructions to reduce the width of the opening by 1.125 inches to create a new width value for used in the facet search, and a range is created between 3.5 inches less than this new width value and the new width value. Similarly, the height is reduced by 0.375 inches and a range is created between 4 inches less than this new height and the new height itself. These created range values are then used for facet search parameters 380.

The facet search is then performed using these facet search parameters 380 and the narrowed results from that facet search are presented to the user interface 320 at step 445.

In one embodiment, step 445 will also cause the server 120 to store the facet values determined at step 440 with a particular server session or with a user identifier. This will allow the facet values determined through this method 400 to follow the user during other shopping experiences at the server 120. For example, if the user first utilized this method 400 while evaluating Ford pickup trucks, the created facet values could be reused later when the user began looking at pickup trucks from another manufacturer. The method ends at step 450.

As explained above, a hierarchy of specific to general facet modifier records 160 can be established in situations where multiple facet modifier records 360 apply to found record set of item records 140. The general French door refrigerator facet modifier record 361 indicates that the 0.375 inches should be subtracted from the input height, but this conflicts with the overlapping but more specific LG French door refrigerator facet modifier record 390 that requires only 0.125 inches to be subtracted. In effect, the two facet modifier records provide contrary instructions relating to the same height attribute 346. In these instances, the facet search at step 445 must be divided into separate searches. In the given example, one facet search will be for LG branded refrigerators where only 0.125 inches was removed from the inputted height of the kitchen opening, and a second facet search will be for all but LG branded refrigerators where 0.375 inches was removed from the inputted height. If two facet modifier records 160 relate to the same attributes 150 but relate to non-overlapping subsets of the found item records 140, both may be applied to their own subset. If the two facet modifier records 160 do not relate to the same attributes 150, there is no conflict and both may be applied (likely one after another) to the entire set of found item records 140.

Flow

Figure 5:
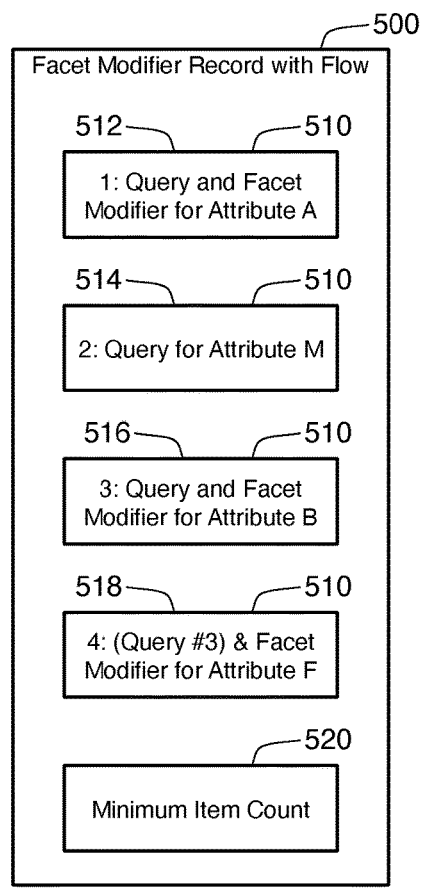
FIG. 5 is a schematic view of another example facet modifier record having multiple alteration data elements.

FIG. 5 shows a facet modifier record 500 having alteration data divided into four different alteration data elements 510, one for each of four different data attributes 150 of an item record 140. Each alteration data element 510 relates to a separate attribute 150 and are ranked or sorted into an order as indicated by the numerical value at the beginning of each alteration data element 510 in FIG. 5. The first 512 and third 516 of these alteration data elements 510 include both query info and a facet modification for the input received by the query. As explained in connection with step 440, the facet modifications define how user input from a query is to be altered before being used as facet search parameter for the facet search of step 445.

The second alteration data element 514 does not include any facet modification, but rather only includes the query information. In this case, the user input from the query is used directly as the facet search parameter in the facet search of step 445. For example, alteration data element 514 may ask for a minimum miles-per-gallon rating for a pickup truck, and the inputted data would be directly used as a facet search parameters in step 445 without any modification. The other alteration data elements 512, 516, and 518 all include facet modifications, and therefore will modify any inputted data before the data is used as a facet search parameter.

The fourth alteration data element 518 does not include its only query information, but rather links to and relies upon query #3 established in the third alteration data element 516. This would be the case where the query in the third alteration data element 516 provides sufficient information for both the facet modifier for Attribute B (found in alteration data element 516) and the facet modifier for Attribute F (found in alteration data element 518). For example, a single query concerning the anticipated load for a pickup truck is sufficient to establish a length attribute, a width attribute, and a max load weight attribute for a pickup truck bed.

The ordering of the alteration data elements 510 in FIG. 5 creates a "flow" in which queries can be presented sequentially to a user. The ordering of the queries is based on the ordering of the alteration data elements 510 in the facet modifier record 500.

Method 600 of FIG. 6 provides one method for presenting a flow of queries. The method begins at step 605 by identifying all alteration data elements 510 in the facet modifier record 500 defining a flow. As was the case in FIG. 4, the facet modifier record 500 is selected (step 425) after a search (step 415) based on the found item records 140.

Step 610 examines the number of item records 140 in the current found set. This step ensures that there aren't so few item records 140 that further refinement by facet searching is unhelpful or even counterproductive. In some embodiments, step 610 compares the number found to a fixed number that does not change based on the facet modifier record 500. In other embodiments, the comparison number is the minimum item count 520 specified in the facet modifier record 500. The comparison number in one embodiment may be, for example, ten. If the number of item records 140 in the current found set is less than ten, then step 610 will identify this, refrain from further narrowing, and the method 600 will end (step 645) as further facet searching is not needed.

If the minimum number of item records 140 is found at step 610, step 615 selects the first (or next if this isn't the first iteration of step 615) alteration data element 510 in the flow defined by the facet modifier record 500. The first alteration data element 510 in FIG. 5 is alteration data element 512, which relates to "Attribute A." This element 512 is selected in step 615.

At step 620, the attribute for this alteration data element 512 (Attribute A) is examined to determine whether multiple values for this attribute are found in the found set of item records 140. For example, if all of the item records 140 in the found set contain the same value for Attribute A, there would be no reason to present a query to the user and to create a facet search to further refine the found set based on this attribute. If step 620 determines that there are multiple values within the found set of item records 140 for the data attribute 150 associated with the selected alteration data element 510, then step 625 will present a query through interface 320 based on the query information in the alteration data element 510. Step 625 will also receive user input from that query. At step 630, the facet modification for the alteration data element 510 is applied to data input, and a facet search based on that altered input is run at step 635. Running the facet search will reduce (or "narrow") the number of item records 140 in the found data set. In one embodiment, step 635 will allow the user to back out of the facet data search if the resulting set of found item records 140 is too small or is otherwise unsatisfactory.

Next, at step 640, the method 600 determines whether any more alteration data elements 510 are found in the flow defined by the facet modifier record 500. Note that if step 620 determined that multiple values do not exist in the found set of item records 140, the process 600 would refrain from presenting a query for the selected alteration data element 510 and instead jump forward to this step 640. If step 640 determines that more alteration data elements 510 exist, the method 600 returns to step 610 (to verify that the count of found item records 140 exceeds the minimum) and step 615 (to select the next alteration data element 510). If step 640 finds that all alteration data elements 510 have been applied, the method 600 ends at step 645.

FIG. 7 presents an alternative method 700 for applying the flow defined by facet modifier record 500. In this method, all alteration data elements 510 are determined and included together in a single facet search. The process 700 starts with step 705 by identifying all the alteration data elements 510 associated with the facet modifier record 500, just as was done in step 605 in method 600. The next step 710 is to select the first (or next) alteration data element 510. The query from that alteration data element 510 is presented at step 715, and input is received from the user. At step 720, the alteration 720 set forth in the alteration data element 510 (if any) is applied to the input. Step 725 determines if more alteration data elements 510 are to be evaluated. If so, the process 700 returns to step 710. If not, the facet search with all of the facet values from step 720 is performed at step 730. Again, the user is given the option to back out of these facet search, if desired. The method then ends at step 735.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method comprising:
  a) establishing item records in a database, the item records having attributes;
  b) performing a search on the item records to return a found set of item records;
  c) identifying, after performing the search, a first facet modifier record that matches a plurality of item records in the found set of item records, the first facet modifier record having a first facet modification associated with first query information;
  d) presenting a first query created based on the first query information to a user interface;
  e) receiving first input from the user interface in response to the first query;
  f) altering the first input based on the first facet modification to generate a first facet search parameter;
  g) performing a first facet search to narrow the found set of item records based on the first facet search parameter, resulting in a first narrowed set of item records; and
  h) presenting the first narrowed set of item records to the user interface.

2. The method of claim 1, wherein the first input is a numerical value, wherein the first facet modification defines a mathematical alteration of the first input that generates the first facet search parameter.

3. The method of claim 2, wherein the first facet modification further establishes a numeric range for the first facet search parameter.

4. The method of claim 1, wherein the first input is a selected text-based value selected from a set of text-based values, wherein the first facet modification generates a numerical value based on the selected text-based value.

5. The method of claim 1, wherein the first facet modification and the first query information comprise a first alteration data element in the first facet modifier record, and wherein the first facet modifier record further comprises a second alteration data element having a second facet modification associated with the first query information, further comprising:
  i) altering the first input based on the second facet modification to generate a second facet search parameter, and
  ii) performing the first facet search based on the second facet search parameter as well as the first facet search parameter.

6. The method of claim 1, wherein the first facet modification and the first query information comprise a first alteration data element in the first facet modifier record, and wherein the first facet modifier record further comprises a second alteration data element having a second facet modification associated with second query information, further comprising:
  i) presenting a second query created based on the second query information to the user interface,
  ii) receiving second input from the user interface in response to the second query, and
  iii) altering the second input based on the second facet modification to generate a second facet search parameter.

7. The method of claim 6, wherein the first facet search is based on the first facet search parameter and the second facet search parameter.

8. The method of claim 6, wherein the first facet search is based on the first facet search parameter and is performed before presenting the second query to the user interface, further comprising performing a second facet search based on the second facet search parameter to narrow the first narrowed set of item records, resulting in a second narrowed set of item records.

9. The method of claim 8, further comprising determining that a minimum number of item records exist in the first narrowed set of item records before presenting the second query.

10. The method of claim 9, wherein the minimum number of item records is determined by determining a minimum item count value in the first facet modifier record.

11. The method of claim 9, wherein the second alteration data element is associated with a second attribute in the item records, further comprising determining that a plurality of values exists for the second attribute for the item records in the first narrowed set of item records before presenting the second query.

12. The method of claim 11, wherein the first facet modifier record further comprises a third alteration data element having a third facet modification associated with third query information.

13. The method of claim 12, further comprising determining that too few item records exist in the second narrowed set of item records and refraining from presenting a third query created based on the third query information to the user interface.

14. The method of claim 1, wherein the first facet modifier record is stored as a data record in the database.

15. A method comprising:
  a) establishing item records in a database, the item records having attributes;
  b) performing a search on the item records to return a found set of item records;
  c) establishing facets based on the attributes contained in the found set of item records;

d) identifying a first facet modification by matching the first facet modification to a plurality of item records in the found set of item records, the first facet modification being associated with first query information;
e) presenting a first query created based on the first query information to a user interface;
f) receiving first input from the user interface in response to the first query;
g) altering the first input based on the first facet modification to generate a first facet search parameter;
h) performing a first facet search to narrow the found set of item records based on the first facet search parameter, resulting in a first narrowed set of item records; and
i) presenting the first narrowed set of item records to the user interface.

16. The method of claim 15, wherein the first input is a numerical value, wherein the first facet modification defines a mathematical alteration of the first input that generates the first facet search parameter.

17. The method of claim 15, wherein the first input is a selected text-based value selected from a set of text-based values, wherein the first facet modification generates a numerical value based on the selected text-based value.

18. A method comprising:
a) establishing item records in a database, the item records having attributes;
b) performing a search on the item records to return a found set of item records;
c) establishing facets based on the attributes contained in the found set of item records;
d) identifying a first facet modification that matches a plurality of item records in the found set of item records, the first facet modification being associated with first query information;
e) identifying a second facet modification that matches a first subset of the plurality of item records, where in second subset of the plurality of item records matches the first facet modification but does not match the second facet modification;
f) presenting a first query created based on the first query information to a user interface;
g) receiving first input from the user interface in response to the first query;
h) altering the first input based on the first facet modification to generate a first facet search parameter for the second subset of the plurality of item records and performing a first facet search on the second subset of the plurality of item records based on the first facet search parameter;
i) altering the first input based on the second facet modification to generate a second facet search parameter for the first subset of the plurality of item records and performing a second facet search on the first subset of the plurality of item records based on the second facet search parameter; and
j) presenting results of the first facet search and the second facet search to the user interface.

19. The method of claim 18, wherein the first input is a numerical value, wherein the first facet modification defines a first mathematical alteration of the first input to generate the first facet search parameter, and wherein the second facet modification defines a second mathematical alteration of the first input to generate the second facet search parameter, further wherein the first mathematical alteration is different from the second mathematical alteration.

20. The method of claim 18, wherein the first input is a selected text-based value selected from a set of text-based values, wherein the first facet modification generates a first numerical value based on the selected text-based value, and further wherein the second facet modification generates a second numerical value different than the first numerical value based on the selected text-based value.

* * * * *